Oct. 24, 1939.  C. F. CRUMB ET AL  2,176,992
TRACTOR MOWER
Filed June 19, 1937  2 Sheets-Sheet 1

Inventor
Charles F. Crumb
and Samuel E. Hilblom.
By V. F. Lamagne
Att'y.

Oct. 24, 1939.   C. F. CRUMB ET AL   2,176,992
TRACTOR MOWER
Filed June 19, 1937   2 Sheets-Sheet 2
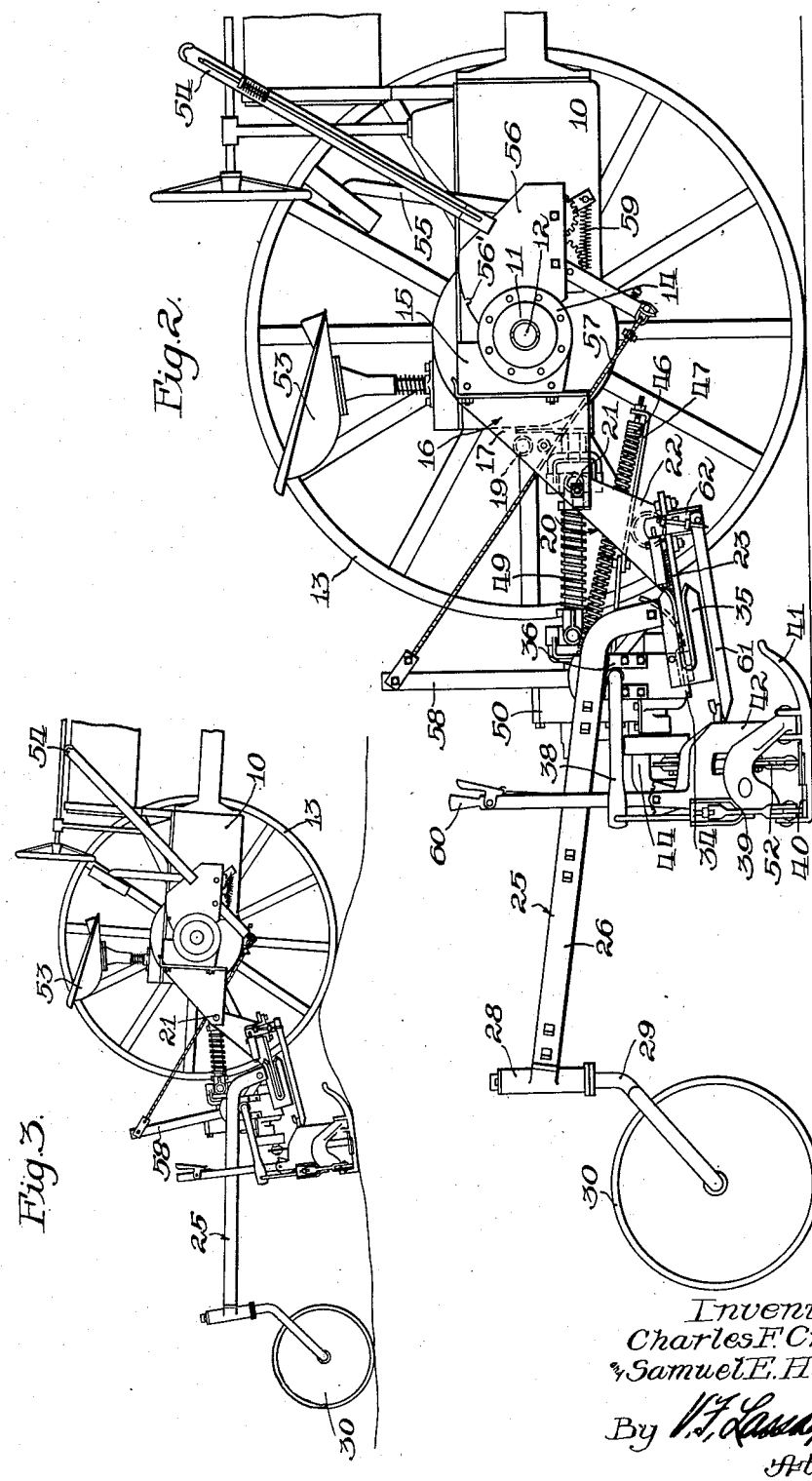
Inventor
Charles F. Crumb
& Samuel E. Hilblom
By V. F. Lasagne
Att'y.

Patented Oct. 24, 1939

2,176,992

UNITED STATES PATENT OFFICE 2,176,992

TRACTOR MOWER

Charles F. Crumb and Samuel E. Hilblom, Chicago, Ill., assignors to International Harvester Company, a corporation of New Jersey Application June 19, 1937, Serial No. 149,168

27 Claims. (Cl. 56—25)

This invention relates to a mower and more particularly to a mower adapted to be supported behind a tractor and drawn thereby, and especially to a mower directly connected to a tractor and adapted to be operated over uneven terrain.

It is common practice in tractor mowers to provide a supporting frame at the rear of the tractor to which is connected one end of a mower frame, the other end of the frame being supported on a ground engaging wheel, such as a caster wheel. Numerous difficulties were experienced with the above mentioned construction; namely, in providing free vertical movement within wide limits of the mower cutting mechanism and shoe as the caster wheel followed the contour of the ground. Other problems arose in providing a suitable pivot axis for the mower that would permit satisfactory movability. Still other problems arose in endeavoring to provide a suitable frame structure that was releasable from the supporting structure on the tractor to obviate damage when the mower encountered an obstruction.

The principal object of the invention, therefore, is to provide a mower for attachment to a tractor in such a manner that free vertical movement of the mower structure will be permitted within wide limits as the caster wheel and tractor follow the contour of the ground.

An important object of the invention is to provide a pair of frame structures mounted for vertical movement as a unit about a horizontal pivot axis on the tractor and separable or releasable about a vertical axis when the mower cutting mechanism strikes an obstruction.

Another important object is to provide for the location of the horizontal pivot axis in such a manner as will permit comparatively free vertical movement of the mower and cutting mechanism without damage to the mower guards from interference with the ground as the tractor and mower follow the ground contour.

Another important object is to provide for the location of this horizontal axis closely adjacent the rear axle housings of the tractor, at least within the periphery of the tractor rear wheels.

Another important object is to provide means on one of the frame structures for maintaining the positions of the two frame structures for the aforesaid vertical movement as a unit.

Another object is to provide a draft frame or supporting structure pivotally mounted on the tractor and a mower frame pivotally connected to the draft frame on a vertical axis.

Another object is to provide the frame structures in such a manner that the pivot axes are in relatively widely spaced relation to each other.

Still another object is to provide for the location of the horizontal pivot axis within the periphery of the tractor rear wheels and the vertical pivot axis outside the periphery of said wheels.

Still another object is to provide a ground engaging means for supporting the rearward end of the mower frame structure.

Still another object is to provide a frame structure carried by the mower frame and including means for providing additional support for the mower frame on the supporting frame or draft frame for normally holding said frame in operative position.

Briefly and specifically, the above and other objects are achieved by providing a draft frame pivotally connected to a tractor on a horizontal axis. A rearwardly extending mower frame structure is supported at its rear end on a caster wheel and at its forward end at one side by a bracket pivotally connected about a vertical axis to a bracket on the draft frame and connected at the other side to the draft frame by other means for maintaining the position of the mower frame structure with respect to the draft frame for permitting vertical movement of the two as a unit about the horizontal axis on the tractor. A releasable latch, or equivalent, means is provided for normally holding the mower frame in operative position, said frame being releasable from the draft frame about the pivotal axis of the brackets thereon when the cutting mechanism on the mower frame strikes an obstruction.

A further understanding of the objects and desirable features of the invention may be had from the following description of a preferred embodiment of the invention taken in conjunction with the accompanying sheets of drawings, in which:

Figure 2 is a side elevational view of the structure shown in Figure 1 with the near wheel of the tractor removed to better illustrate the relationship between the component parts; and, Figure 3 is a smaller view similar to Figure 2 showing the relative positions of the tractor, the frame structure, the mower and the caster wheel when the tractor and mower operate over uneven ground.

Figure 1:
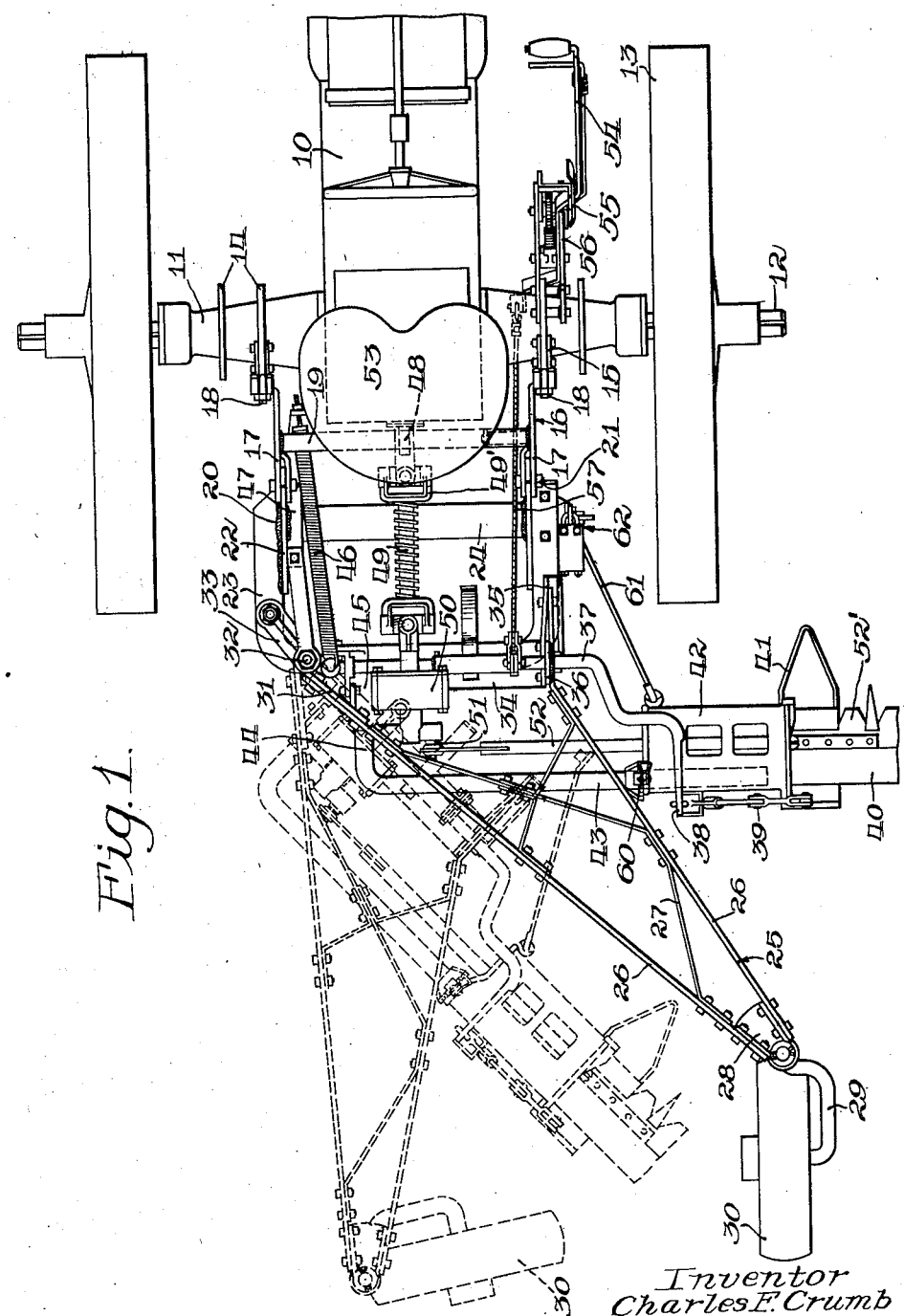
Figure 1 is a general plan view illustrating the improved frame structure and showing in broken lines the released position of the mower frame as it appears when swung back from the draft frame.

The following description is of a preferred construction illustrated for the sake of disclosure and shows the improved frame structures as attached to a tractor of the general purpose type, only the rear portion of which is shown. This tractor comprises generally a main body portion 10 having at either side thereof transverse axle housings 11, through each of which extend the drive axles 12 carrying drive wheels 13. Each axle housing 11 is provided with a pair of spaced attaching flanges 14. Attaching members 15 are attached to the inner flanges 14 and have connected thereto a supporting structure 16 of the quick attachable type. The supporting structure comprises a pair of spaced brackets 17 connected by eye bolts 18 to the members 14. A tubular brace member 19 extends between the brackets 17, being welded at opposite ends thereto.

A rearwardly and downwardly extending frame structure or draft frame 20 is pivotally connected at 21 on a horizontal axis to the bracket members 17 of the supporting frame 16. This frame structure or draft frame 20 comprises a pair of opposite supporting plates 22 pivotally connected respectively to the bracket members 17 on the aforesaid horizontal axis and having welded or otherwise secured to their lower ends a U-shaped support, which may be in the form of a draw-bar or draft element 23. A large tubular brace 24 is disposed transversely and secured at opposite ends to the plate members 22 of the draft frame. The draft frame 20 and the supporting frame 16 assume the same general position formerly occupied by the usual drawbar of the tractor. From the foregoing description it may be seen that the draft frame 20 is pivotally connected to the tractor on a horizontal axis.

A mower frame structure 25 extends rearwardly and diagonally from the tractor and is supported at its forward end on one side on the draft frame structure, and is releasable therefrom about a vertical axis, as will be presently described.

The mower frame 25 comprises a pair of rearwardly converging frame members 26 interconnected by cross-braces 27, as best shown in Figure 1. The frame structure 25 forms substantially a triangle having at its apex a bracket 28, in which is journaled a spindle 29 for a ground engaging means or caster wheel 30 for supporting the rear end of the mower frame structure 25. At the forward end of the stubbleward frame member 26 is secured about a vertical axis by a pivot pin 32 to a cast bracket 33 rigidly carried by the supporting element 23. The frame structure 25 rigidly carries, transversely thereof between the forward ends of the frame members 26 and substantially in alignment with the pivot pin 32, a transverse frame member 34 providing a support for a mower cutter mechanism. The transverse member 34 also includes means in the form of a bifurcated jaw member 35 for engaging the drawbar 23, thus providing means in addition to the brackets 31 and 33 for suporting the mower frame structure 25 on the supporting frame structure 20.

The transverse frame member 34 is provided at each side adjacent the frame members 26 with an upturned portion, the portion on the stubbleward side being connected to the aforementioned bracket 31 and the portion on the grassward side being connected to a bracket 36 welded to the frame member 26. A transverse rock-shaft 37 is pivotally carried in the above described upturned portions of the member 34 and has its grassward end provided with a rearwardly extending crank portion 38 connected to lifting linkage 39, which is in turn connected to a cutter bar 40 of the mower cutting mechanism. A ground engaging shoe 41 is rigidly carried on a coupling yoke 42, which is rockably mounted on a coupling bar 43, the construction in relation to the parts 39, 40, 41, 42 and 43 being substantially conventional. At the stubbleward side of the mower frame structure, the coupling bar 43 is provided with a longitudinally extending bent portion 44 rockably carried by a bracket structure 45, in turn rigidly carried by the bracket 31 and the transverse frame 34. At its stubbleward end, the rock-shaft 37 is provided with an upwardly extending arm connected to one end of a balancing spring 46, the opposite end of which is connected to a bracket 47 rigidly carried by the pipe 24.

From the above description it will be apparent that the mower frame structure 25 is supported at its forward end on the frame structure 20 and at its rearward end on the caster wheel 30. The mower mechanism is carried below the frame structure 25 for free vertical movement within rather wide limits, as permitted by the pivotal connection between the coupling bar 43 and the bracket 45. The floatability of the mower mechanism and its component parts is best illustrated in Figure 3.

The tractor is provided with a central, longitudinally extending power take-off shaft 48 adapted to drive, through flexible shafting 49, drive mechanism 50 for the mower cutting mechanism. The flexible shafting is pivotally connected to the power take-off shaft by a universal joint 49' having its axis substantially coincident with the horizontal axis 21. This drive mechanism is rigidly carried on the transverse frame member 34 and comprises the usual crank 51 and pitman 52 for reciprocating a knife 52'.

A driver's station or seat 53 is disposed centrally on the main body portion 10 of the tractor, there being provided within easy reach thereof a lifting mechanism for raising the cutter bar 40 for transport or other purposes. This lifting mechanism comprises a hand lever 54 and a foot lever 55 pivotally carried on a supporting plate 56 secured to the inner flange 14 on the right side of the axle housing 11 of the tractor. A flexible connection 57 is releasably connected at one end to the lower end of the hand lever 54 and at the other end is connected to an upstanding arm 58 rigidly secured to the rock-shaft 37. The hand lever 54 and foot lever 55 are interconnected in such a manner that operation of either will impart angular movement to the rock-shaft 37 for raising the cutter bar 40. The spring 46 counterbalances the weight of the bar 40 when it is off the ground. This interconnecting means is also provided so that operation of one of the levers will assist in operation of the other. A spring 59 is connected between the two levers for maintaining the flexible connection 57 normally taut. Another purpose of the spring 59 is to maintain at least one of the levers substantially within easy reach of the operator's station 53, as best illustrated in Figure 3, where the hand lever 54 has moved forwardly because of the position of the mower mechanism as it follows the contour of the ground. It will also be noted from this figure that the hand and foot levers 54 and 55 are so mounted that they do not interfere with the vertical movement of the mower cutting mechanism and its component parts. However, a notch 56' is provided on the plate 56 for locking the hand lever 54 in position when the cutter bar is raised. A hand adjusting lever 60 is carried by the yoke 42 of the mower mechanism for adjusting the position of tilt of the mower shoe 41 and the cutter bar 40.

As previously described, the mower frame structure 25 is supported on the frame structure 20 about the pivot pin 32 between the brackets 31 and 33 at one side and at the other side by the bifurcated bracket 35. A releasable latch or equivalent means is provided for normally holding the frame structure 25 and the mower mechanism in operating position with respect to the support or frame structure 20 for vertical movement as a unit about the aforesaid horizontal axis at 21 on the supporting structure 16 on the tractor. This latch comprises a bar 61 movably connected to the coupling yoke 42 at one end and at the other end to some suitable release means 62. This latch means may be of any conventional construction well known to those skilled in the art.

In the operation of the mower, the structure described above permits free vertical movement of the cutting mechanism within rather wide limits as the frame structures 20 and 25 move vertically as a unit about the horizontal axis 21 while the tractor and caster wheel follow the contour of the ground. When the cutting mechanism strikes an obstruction, the mower frame structure 25 is releasable or separable from the frame structure 20 about the vertical axis of the pin 32. At the same time, when the latch means 62 is released, the forward end of the flexible connection 57 of the lifting mechanism is released from the lower end of the hand lever 54.

This separable or releasable position is best shown in dotted lines in Figure 1. To connect the frame structure 25 with the frame structure 20, the tractor is backed until the frame structure 25 swings forwardly toward the draft frame 23. The bifurcated bracket 35 serves to guide the forward end of the frame structure 25 onto the draft frame 23, and the releasable latch means is again connected for continued operation of the mower behind the tractor.

It will be apparent that the construction described above assumes even greater importance when utilized in conjunction with a mower of the border type, which is especially adapted for use in fields that have been prepared for irrigation. As is well known, fields prepared for irrigation incorporate borders, and, in addition to other irregularities, these borders present a ground contour over which it becomes difficult to operate a mower without leaving some uncut crop.

Now, the construction provided by the present invention overcomes these difficulties inasmuch as the axis of the pivotal connection between the mower mechanism and the tractor rear axle housings is located in such a position as to permit the best possible free vertical movement of the mower independent of the frame structure as the tractor wheels and caster wheel follow the contour of the ground.

According to the present invention, the location of the horizontal pivot axis is longitudinally spaced rearwardly of the tractor rear axle housing a comparatively short distance, at least within the periphery of the tractor wheels, and of a height substantially in horizontal alignment with the power take-off shaft of the tractor.

The location of this horizontal axis in close proximity to the power take-off shaft of the tractor enables the flexible drive shafting to be connected to the power take-off shaft at a point having substantially the same axis as the horizontal axis of the pivotal connection between the tractor and the mower. This construction eliminates complicated telescoping shafting and special universal joints to compensate for extreme angularity of the parts of the drive shafting.

The location of the horizontal pivot axis at a point in close proximity to the tractor rear axle housings provides a close coupled mower which positions the cutting mechanism of the mower in close proximity to the tractor wheels, thus permitting the cutting mechanism to follow the tractor wheels closely over the contour of the ground. It will be apparent that the construction as described will permit the cutting mechanism to reach even the lowest portions of the field, leaving no uncut crop. The respective close coupled positions of the tractor and mower are especially desirable in operating the tractor and mower over the abrupt inclinations presented by the borders at their junction with the lower portions of the field.

It will be understood, of course, that the construction described above is merely a preferred embodiment of the invention illustrated for the sake of disclosure, and numerous alterations and modifications may be made in said construction without departing from the spirit and scope of the invention as defined in the appended claims.

What is claimed is:

1. In a tractor mower attachment in which the tractor includes a supporting structure carried thereby, the combination with the supporting structure of a mower comprising a frame structure pivotally connected to said supporting structure on a horizontal axis, a second frame structure pivotally connected to the first frame structure on a vertical axis, cutting mechanism carried by said second frame, and a releasable connection having a portion associated with the two frames for normally holding the second frame in operative position with respect to the first frame for movement of the frames as a unit about the horizontal axis on the supporting structure.

2. In a tractor mower attachment in which the tractor includes a draw-bar pivotally connected thereto, the combination with the draw-bar of a mower comprising a frame structure. means pivotally connecting the frame to the draw-bar on a vertical axis, cutting mechanism carried by said frame, and a releasable latch including a portion associated with the frame and the draw-bar for normally ho'ding the frame in operative position with respect to the draw-bar for movement therewith as a unit about the pivot on the tractor.

3. In a tractor mower attachment in which the tractor includes a supporting structure carried thereby and a draw-bar pivotally connected to said supporting structure, the combination with the draw-bar of a mower comprising a frame structure, means pivotally connecting the frame to the draw-bar on a vertical axis, cutting mechanism carried by said frame, and a releasable latch including a portion associated with the frame and the draw-bar for normally holding the frame in operative position with respect to the draw-bar for movement therewith as a unit about the pivot on the supporting structure.

4. In a tractor mower attachment in which the tractor includes a supporting structure comprising brackets carried by the tractor, the combination with the brackets of a mower comprising a pair of frame structures, one of which is adapted to be pivotally connected to the bracket on a horizontal axis, cutting mechanism on the other frame structure, ground engaging means supporting said frame, and a releasable means normally interconnecting and holding both frames in position for vertical movement as a unit about the aforesaid horizontal axis as the ground engaging means follows the contour of the ground, the means being releasable to release said cutting mechanism carrying frame from the other frame.

5. In a tractor mower attachment, the combination of a draft frame adapted to be pivotally connected to the tractor on a horizontal axis, a caster wheel disposed rearwardly of the tractor, a mower comprising a frame structure and cutting mechanism carried thereby supported at its rearward end on the caster wheel and at its forward end on the draft frame, said forward support including a pivotal connection on a vertical axis spaced from the aforesaid horizontal axis, and a releasable latch including a portion associated with the draft frame and the frame structure normally holding the mower in operative position for vertical movement with the draft frame about said horizontal axis as the caster wheel follows the contour of the ground, said latch being releasable for releasing the mower from the draft frame about the aforesaid vertical axis.

6. In a tractor mower attachment, the combination of a supporting frame adapted to be pivotally carried by the tractor on a horizontal axis, a caster wheel disposed rearwardly of the tractor, a mower frame supported adjacent its rear end on the caster wheel and adjacent its forward end on the supporting frame, the forward support including a bracket on the mower frame and a bracket on the supporting frame, said brackets being pivotally interconnected on a vertical axis, and means between the two frames for normally holding said frames together for movement as a unit about the horizontal axis on the tractor, said means being releasable to release the mower frame from the supporting frame about the aforesaid vertical axis.

7. In a tractor mower attachment, the combination of a supporting frame adapted to be pivotally connected to the tractor on a horizontal axis, a mower frame extending rearwardly from and supported on the supporting frame, said support including a bracket on each frame pivotally interconnected on a vertical axis, a frame structure carried by said mower frame and including means spaced from the brackets for providing additional support for the mower frame on the supporting frame for normally holding said frames in operative position for movement as a unit about the aforesaid horizontal axis, and mower cutting mechanism carried by said frame structure, and releasable means associated with the mower and releasable for releasing said mower frame from operative position with respect to the supporting frame about the aforesaid vertical axis when the cutting mechanism strikes an obstruction.

8. In a tractor mower attachment, the combination of a supporting frame adapted to be pivotally connected to the tractor on a horizontal axis, a mower frame extending rearwardly from and supported on the supporting frame, a caster wheel supporting the rear of said frame, said forward support including a bracket on each frame pivotally interconnected on a vertical axis, a frame structure carried by said mower frame and including means spaced from the brackets for providing additional support for the mower frame on the supporting frame, a releasable latch associated with the mower frame and cooperating with said means for normally holding said frames in position for movement as a unit about the aforesaid horizontal axis as the caster wheel follows ground contour, and mower cutting mechanism carried by said frame structure, said latch being releasable to release the mower frame from the supporting frame about the aforesaid vertical axis when the cutting mechanism strikes an obstruction.

9. In a tractor mower attachment in which the tractor includes having a power take-off, the combination of a supporting frame adapted to be pivotally connected to the tractor on a horizontal axis, a mower frame supported on the supporting frame, said support including means for pivotally connecting the frames about a vertical axis, a frame structure carried by said mower frame and including means spaced from the first means for providing additional support for the mower frame on the supporting frame for normally holding said frames in position for movement as a unit about the aforesaid horizontal axis, mower cutting mechanism carried by said frame structure, drive means for said cutting mechanism supported on the frame structure and adapted to be connected to the power take-off of the tractor, and releasable means associated with the mower frame and releasable for releasing said mower frame from the supporting frame about the aforesaid vertical axis and said drive means being releasable from the power take-off when the cutting mechanism strikes an obstruction.

10. In a tractor mower attachment for use with a tractor having a rear axle housing and traction wheels, a rear connected mower having means adapted to be detachably connected to the axle housing for vertical movement of the mower about a transverse axis located rearwardly of said housings and within the periphery of said wheels, and ground engaging means supporting the mower rearwardly of said wheels.

11. In a tractor mower attachment for use with a tractor having a rearwardly extending power take-off shaft, a rear axle housing and traction wheels, the combination of a rear connected mower having means adapted to be detachably connected to the axle housing for vertical movement of the mower about a transverse horizontal axis located rearwardly of said housing and within the periphery of said wheels, cutting mechanism carried by the mower, drive mechanism for the cutting mechanism including flexible shafting adapted to be pivotally connected to the power take-off shaft at a point substantially coincident with the aforesaid horizontal axis.

12. In a tractor mower attachment for use with a tractor having traction wheels, rear axle housings and attaching flanges thereon, the combination with the flanges, of brackets adapted to be detachably connected to the flanges to extend rearwardly therefrom, a mower having means pivotally connecting said mower to said brackets for vertical movement thereof with respect to the brackets about a transverse horizontal axis located within the periphery of the traction wheels.

13. In a tractor mower attachment for use with a tractor having traction wheels, rear axle housings and attaching flanges thereon, the combination with the flanges, of brackets adapted to be detachably connected to the flanges to extend rearwardly therefrom, a mower including a frame extending rearwardly and diagonally from the tractor, and ground engaging means supporting the rearward end of said frame, and means pivotally connecting said frame at its forward end to the brackets for vertical movement thereof with respect to the brackets about a transverse horizontal axis located within the periphery of the wheels.

14. In a tractor mower attachment, a rear connected mower comprising, in combination, two frame structures, means interconnecting said frames for relative movement about a vertical axis, cutting mechanism carried by one of said frames, means on the other of said frames adapted to pivotally connect that frame to the tractor on a horizontal axis, and a separable connection associated with said frames for normally holding said frames in operative position for movement as a unit about the aforesaid horizontal axis, said connection being separable to permit rearward swinging movement of the cutting mechanism carrying frame with respect to the other frame about the aforesaid vertical axis.

15. In a tractor mower attachment, a rear connected mower comprising, in combination, a frame structure, means for pivotally connecting said frame to the tractor on a horizontal axis, a second frame structure, means for pivotally connecting said second frame to the first frame on a vertical axis, cutting mechanism carried by said second frame, and a releasable connection associated with the second frame normally holding said second frame in operative position with respect to the first frame and cooperating with the aforesaid second pivotal means to hold the frames together for movement of the frames as a unit about the aforesaid horizontal axis.

16. In a tractor mower attachment in which the tractor includes a supporting structure carried at the rear end thereof, the combination with the supporting structure of a mower comprising two frame structures, cutting mechanism carried by one of said frames, means between said frames for pivotally interconnecting same on a vertical axis, means on one frame for pivotally connecting that frame to the supporting structure for movement about a horizontal axis, means cooperating with the first pivotal means for normally holding the cutting mechanism carrying frame in operative position with respect to the other frame for movement of the two frames as a unit about the aforesaid horizontal axis, said last named means being releasable to release the cutting mechanism carrying frame from the other frame for rearward swinging movement thereof about the aforesaid vertical axis.

17. In a tractor mower attachment in which the tractor includes a supporting structure comprising a pair of spaced brackets connected to the tractor and a brace member secured between said brackets, the combination with the brackets of a mower comprising a pair of frames, cutting mechanism carried by one of said frames, means pivotally connecting the cutting mechanism carrying frame to the other frame for movement with respect thereto about a vertical axis, means pivotally connecting said other frame to the brackets for movement about a horizontal axis, and means associated with the frames for normally holding the two frames in operative position for movement as a unit about the aforesaid horizontal axis, said means being separable for permitting rearward swinging movement of the cutting mechanism carrying frame with respect to the other frame about the aforesaid vertical axis.

18. In a tractor mower attachment, a mower adapted to be carried thereby and comprising, in combination, two frame structures, means connecting one frame to the tractor for movement about a horizontal axis, a pair of means interconnecting the two frames for movement as a unit about said horizontal axis, one of said means comprising a pivotal connection having a vertical pivot axis, the other means comprising a separable connection for normally holding the two frames in operative position for the aforesaid movement as a unit, said last named connection being separable to permit relative movement between the frames about the aforesaid vertical axis, and cutting mechanism carried by one of the frames.

19. In a tractor mower attachment, a mower comprising, in combination, a frame structure, means adapted to pivotally connect said frame to the tractor on a horizontal axis, a second frame structure extending rearwardly from the first frame structure, means at the forward end of said second frame structure for pivotally connecting said frame to the first frame on a vertical axis, ground engaging means for supporting the second frame adjacent its rearward end, cutting mechanism carried by said second frame, and a separable connection including a portion associated with the two frames for normally holding said frames in operative position for movement as a unit about the aforesaid horizontal axis, said connection being separable to permit rearward swinging movement of the second frame with respect to the first frame about the aforesaid vertical axis.

20. In a tractor mower attachment, a mower comprising, in combination, two frame structures, a cutting mechanism carried by one frame structure, means pivotally connecting the other frame structure to the tractor on a horizontal axis, means pivotally interconnecting the two frame structures on a vertical axis disposed rearwardly of the horizontal axis, said cutting mechanism carrying frame extending rearwardly from the first frame, ground engaging means for supporting the rearward end of the cutting mechanism carrying frame, and a separable connection associated with the frames for normally holding said frames in operative position for movement as a unit about the aforesaid horizontal axis, said means being separable to release the cutting mechanism carrying frame from the other frame for swinging movement about the aforesaid vertical axis.

21. In a tractor mower attachment, a mower comprising, in combination, two frame structures adapted to be carried by the tractor, cutting mechanism carried by one frame structure, means pivotally connecting the other frame to the tractor for movement about a horizontal axis, means pivotally interconnecting said frame structures for relative movement about a vertical axis disposed rearwardly of the horizontal axis, and means for normally holding the two frames in operative position for movement as a unit about the aforesaid horizontal axis, said last named means being releasable to release the cutting mechanism carrying frame from the other frame for movement about the aforesaid vertical axis.

22. In a tractor mower attachment, a mower comprising, in combination, a draft frame adapted to be pivotally carried by the tractor, a frame structure pivotally carried on the draft frame and extending rearwardly therefrom, cutting mechanism carried by said structure, and means associated with the frame structure for maintaining the respective positions of the two frames for movement as a unit above the pivot on the tractor, said means being releasable to release said frame structure from the draft frame about the pivot on the draft frame.

23. In a tractor mower attachment for use with a tractor having a rear axle housing and traction wheels, a rear connected mower comprising, in combination, two frame structures, means interconnecting said frames for relative movement about a vertical axis, cutting mechanism carried by one of said frames, means on the other frame adapted pivotally and detachably to connect that frame to the axle housing on a transverse horizontal axis located rearwardly of said housing and inwardly of the periphery of said wheels, and a separable connection associated with the cutting mechanism carrying frame and normally holding the two frames in operative position for movement as a unit about the aforesaid horizontal axis, said connection being separable to permit rearward swinging movement of the cutting mechanism carrying frame with respect to the other frame about the aforesaid vertical axis.

24. In a tractor mower attachment for use with a tractor having a rear axle housing and traction wheels, a rear connecting mower comprising, in combination, two frame structures, means on one of said frames adapting that frame pivotally and detachably to be connected to the axle housing for vertical movement about a transverse horizontal axis located rearwardly of said housing and inwardly of the periphery of said wheels, cutting mechanism carried by the other frame, means pivotally connecting said cutting mechanism carrying frame to the other frame for movement with respect thereto about a vertical axis located rearwardly of the horizontal axis and outside the periphery of said wheels, and a separable connection associated with the cutting mechanism carrying frame and normally holding the two frames in operative position for movement as a unit about the aforesaid horizontal axis, said connection being separable to permit rearward swinging movement of the cutting mechanism carrying frame with respect to the other frame about the aforesaid vertical axis.

25. In a tractor mower attachment for use with a tractor having a rear axle housing and traction wheels, a rear connecting mower comprising, in combination, two frame structures, means on one of said frames adapting that frame pivotally and detachably to be connected to the axle housing for vertical movement about a transverse horizontal axis located rearwardly of said housing and inwardly of the periphery of said wheels, cutting mechanism carried by the other frame, means pivotally connecting said cutting mechanism carrying frame to the other frame for movement with respect thereto about a vertical axis located outwardly of the periphery of said wheels, ground engaging means supporting the cutting mechanism carrying frame, and a separable connection associated with the cutting mechanism carrying frame and normally holding the two frames in operative position for movement as a unit about the aforesaid horizontal axis, said connection being separable to permit rearward swinging movement of the cutting mechanism carrying frame with respect to the other frame about the aforesaid vertical axis.

26. In a tractor mower attachment comprising, in combination, a frame structure, means adapted to pivotally connect the frame to the tractor for vertical movement about a horizontal axis, a second frame structure, means connecting the second frame to the first frame for vertical movement therewith and for horizontal movement with respect thereto, and cutting mechanism carried by said second frame.

27. In a tractor mower attachment, a mower comprising, in combination, a draft frame adapted to be pivotally carried by the tractor on a horizontal axis, a frame structure pivotally carried on the draft frame on a vertical axis and extending rearwardly therefrom, ground engaging means for supporting the rearward end of the frame structure, cutting mechanism carried by said structure, and means between the frame structure and the draft frame for holding the two frames together for maintaining the respective position of the two for movement as a unit about the aforesaid horizontal axis, said means being separable to release said frame structure from the draft frame about the aforesaid vertical axis when the cutting mechanism strikes an obstruction.

CHARLES F. CRUMB.
SAMUEL E. HILBLOM.